April 19, 1960 A. R. GRAFF ET AL 2,933,435
VERTICAL MALTING APPARATUS
Filed Sept. 24, 1956 6 Sheets-Sheet 3

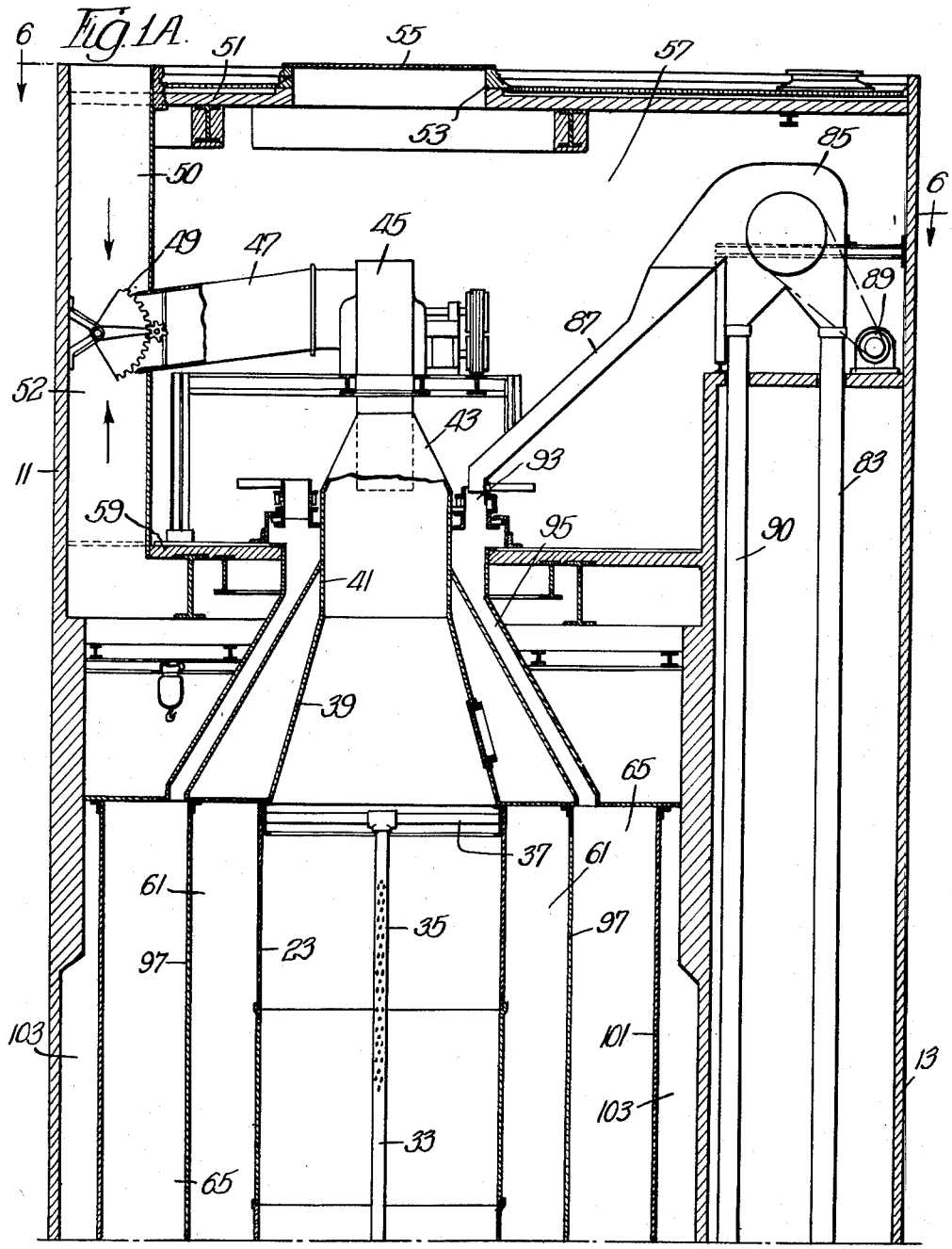

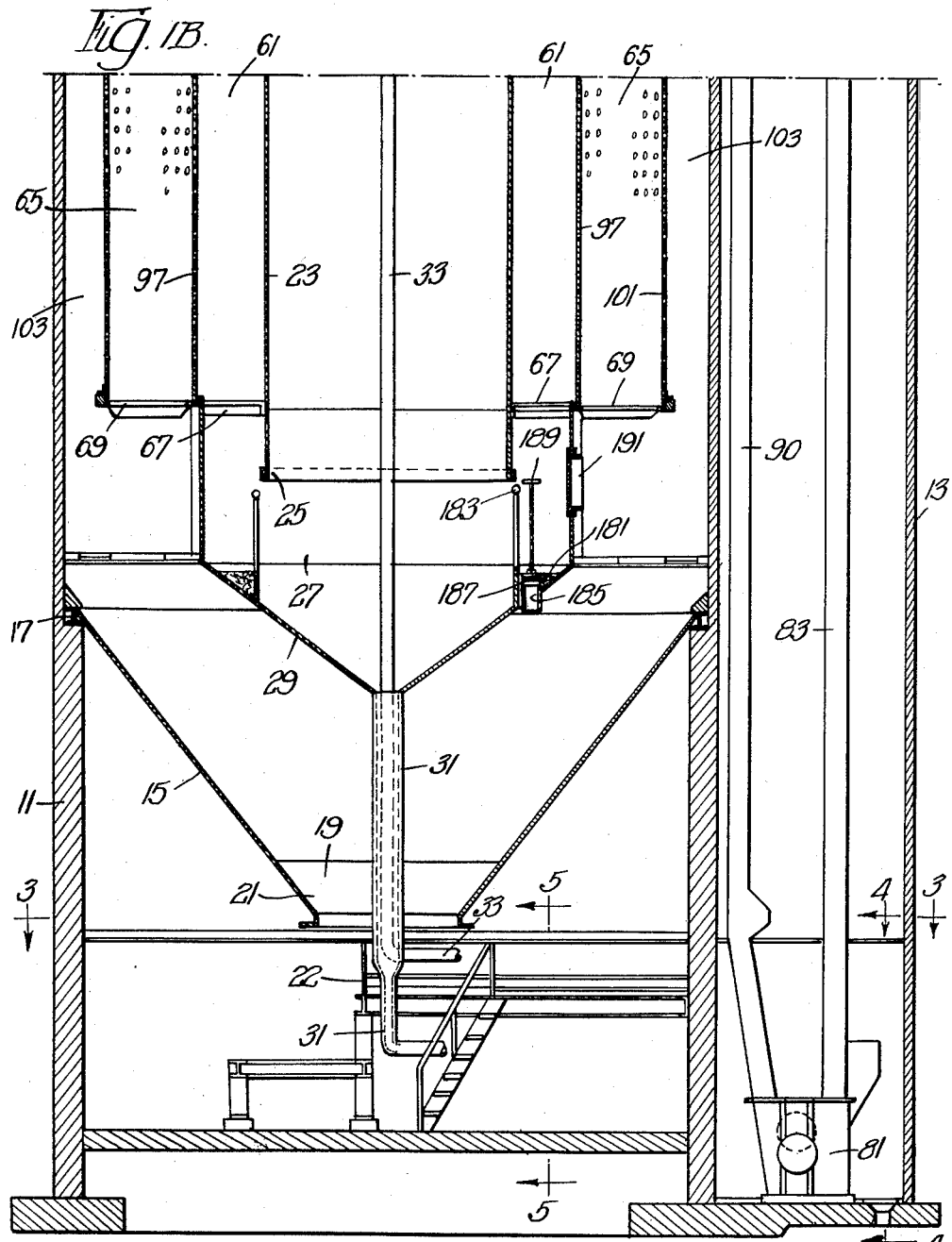

INVENTORS.
Alan R. Graff,
Robert J. Wier,
BY Peter M. Ruzevick,

April 19, 1960  A. R. GRAFF ET AL  2,933,435
VERTICAL MALTING APPARATUS
Filed Sept. 24, 1956  6 Sheets-Sheet 4
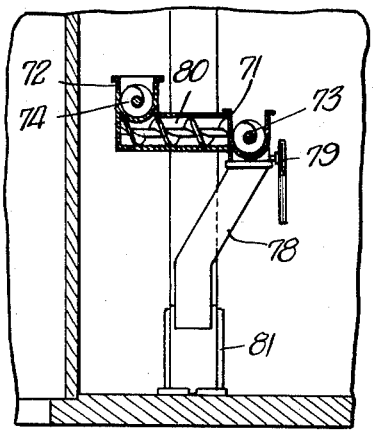
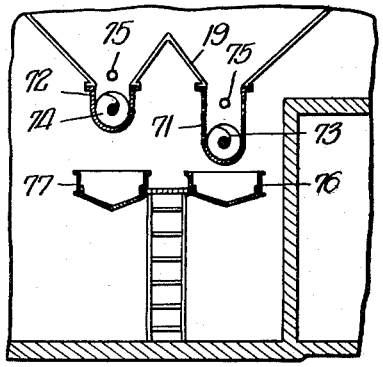
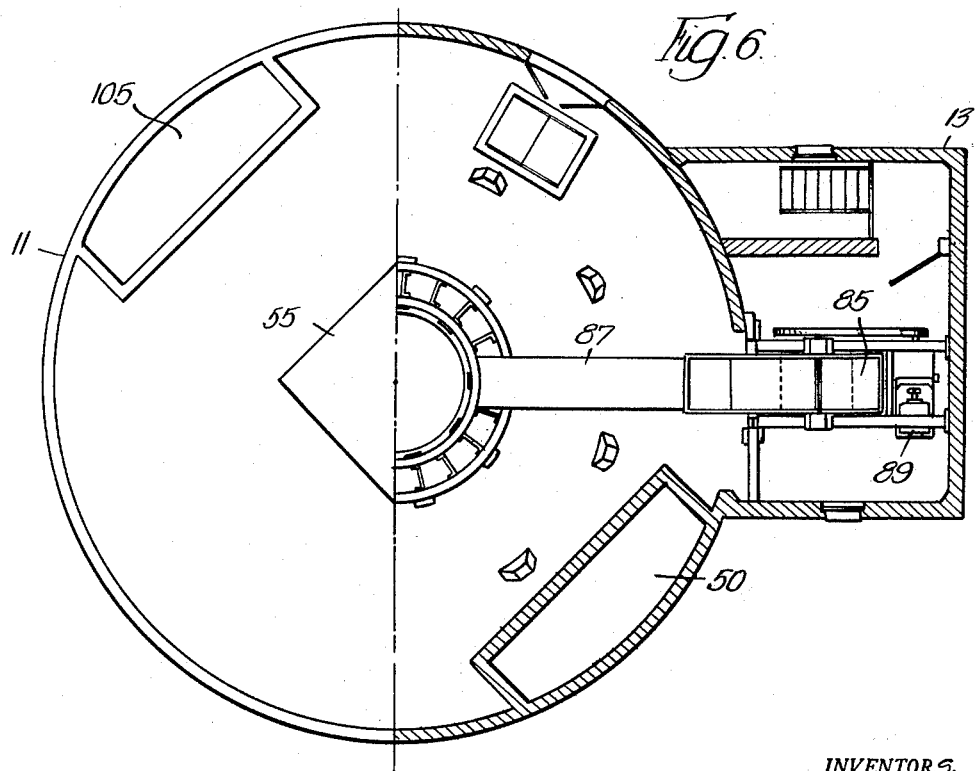
INVENTORS:
Alan R. Graff,
BY Robert J. Wier,
Peter M. Ruzevick.

April 19, 1960  A. R. GRAFF ET AL  2,933,435
VERTICAL MALTING APPARATUS
Filed Sept. 24, 1956  6 Sheets-Sheet 5
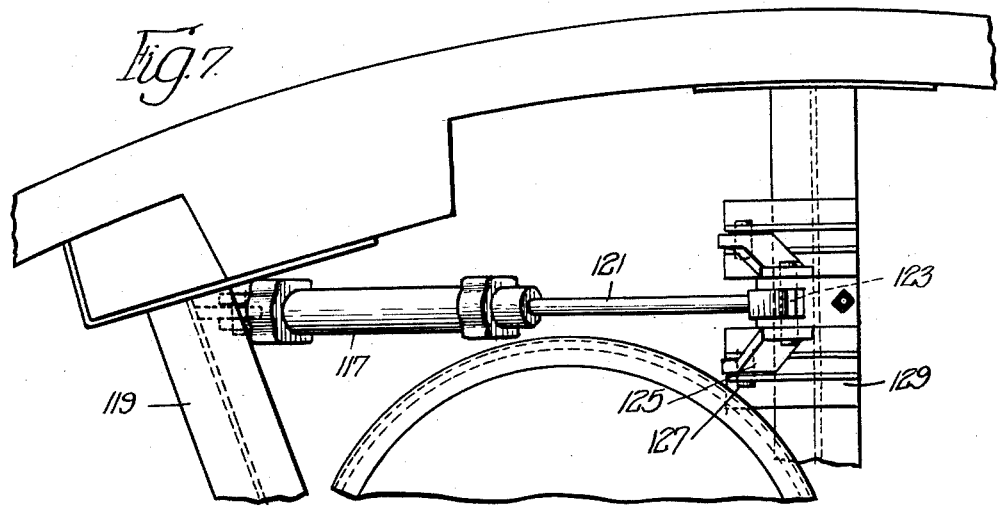
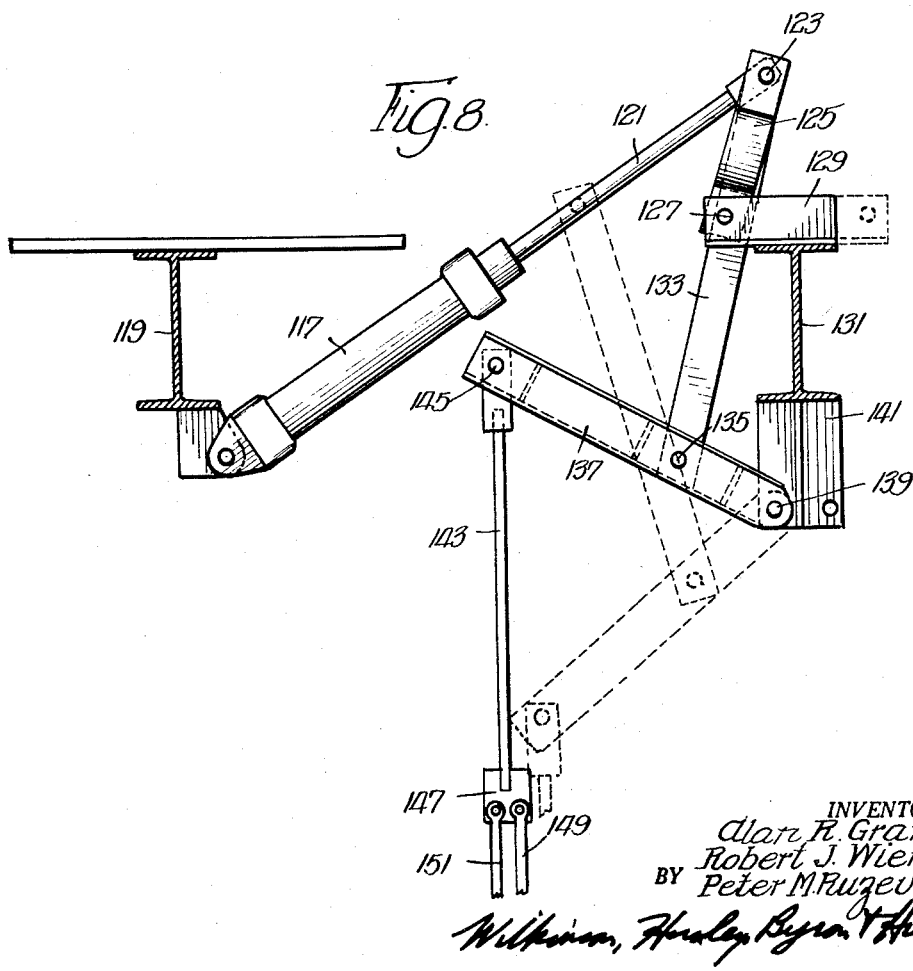
INVENTORS.
Alan R. Graff,
Robert J. Wier,
BY Peter M. Ruzevich, April 19, 1960 A. R. GRAFF ET AL 2,933,435
VERTICAL MALTING APPARATUS
Filed Sept. 24, 1956 6 Sheets-Sheet 6
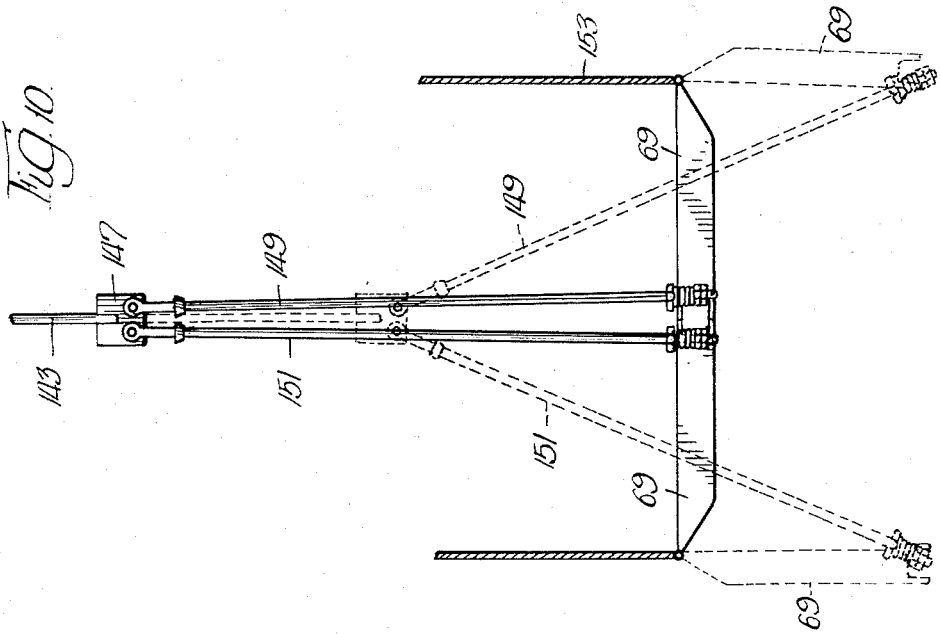
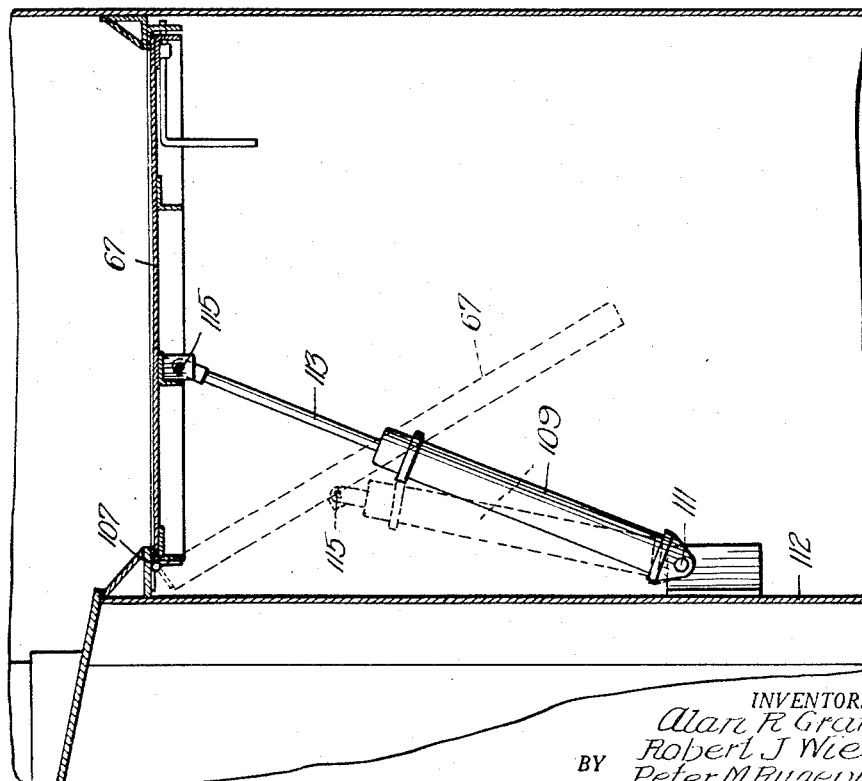
INVENTORS
Alan R. Graff,
Robert J. Wier,
BY Peter M. Rugevick, United States Patent Office 2,933,435
Patented Apr. 19, 1960

2,933,435
VERTICAL MALTING APPARATUS

Alan R. Graff, Flossmoor, Robert J. Wier, Mount Prospect, and Peter M. Ruzevick, Chicago, Ill., assignors to The Columbia Malting Company, Chicago, Ill., a corporation of Illinois Application September 24, 1956, Serial No. 611,572

16 Claims. (Cl. 195—129)

This invention relates to new and improved malting apparatus and methods and more particularly to a vertical malting apparatus and methods of malting which include handling and treating the grain in vertical columns.

In brief, the malting of grain includes successive periods in which the grain is steeped in water, germinated and dried. The present apparatus and methods relate to the germinating and drying stages of the operation. The germinating stage requires careful control of temperature and humidity and also requires periodic movement of the grain to prevent matting of the rootlets developed in germination. This movement is also important in insuring substantially uniforming heating and treatment of the grain which is handled in relatively large masses in commercial operations. It is necessary to pass air through the grain during the different stages of operation and this air will be varied in temperature, humidity and amount during such stages. During germination the humidity must be controlled. Also, during this period temperature of the germinating mass must be controlled. Substantial quantities of air are passed through the grain and it will be apparent that when atmospheric air is used its temperature varies widely during seasonal changes from winter to summer. The moisture content or relative humidity of the air also varies from time to time over a considerable range.

The germination is an exothermic reaction and the air passed through the grain must take up sufficient of this heat to avoid overheating the grain. Consequently at times it is necessary to cool atmospheric air to reduce its temperature sufficiently below that of the germinating grain so that the quantity of air passed through the grain will remove this excess heat. On the other hand, during the drying stage relatively large quantities of heated air are required to carry out the moisture remaining in the malted grain. The drying period is much shorter than the germinating period and much larger quantities of air are used per unit of time.

In order to provide a commercially practical malting apparatus it is important to so relate the capacities of the various portions of the apparatus that no major portion of the apparatus is idle for substantial portions of time. Because of increasing labor costs it is important that all handling and movement of the grain be accomplished by mechanical means.

It is an object of the present invention to provide a new and improved vertical malting apparatus.

It is a further object to provide new and improved methods of malting involving the vertical handling and movement of the grain.

It is also an object to provide apparatus which is compact and permits the mechanical handling of large quantities of grain.

It is an additional object to provide apparatus so designed as to handle the grain continuously with a minimum of unused space at any period of operation.

It is also an object to provide an apparatus which will facilitate the establishment, regulation and close control of air and grain temperatures in such a manner that uniformity of temperature and moisture content are readily and consistently maintained within close limits throughout the active mass of grain within the apparatus.

It is an additional object to provide apparatus which lends itself readily to instrumentation and automatic control of all phases of the process.

It is another object to provide a method of handling the grain which facilitates the addition of water to the grain as it is being turned over during the germinating phase of operation.

It is also an object to provide an apparatus and method adapted to take care of the expansion and contraction of the charge of grain during the process.

It is an additional object to provide an apparatus and method by means of which the charge is treated in vertical columns surrounding air tempering and distributing chambers in a manner highly economical of space.

It is another object to provide apparatus in which the air spaces and passages are designed and adjusted dimensionally to the cross sectional areas required to give optimum flow rates.

Other and further objects will appear as the description proceeds.

We have shown certain preferred embodiments of our invention in the accompanying drawings in which—

Figure 1A is a vertical section through the upper portion of the malting apparatus;

Figure 1B is a continuation of Figure 1A showing the lower portion of the malting apparatus;

Figure 4 is a section taken on line 4—4 of Figure 1B;

Figure 5 is a section taken on line 5—5 of Figure 1B;

Figure 6 is a transverse section taken on line 6—6 of Figure 1A;

Figure 7 is an enlarged plan view of the malt bin door operating apparatus;

Figure 8 is a side elevation of the construction of Figure 7;

Figure 9 is a side elevation, partly in section, of the damper construction and operation; and Figure 10 is an elevation, partly in section, of the grain bin doors and operating connections.

Figure 2:
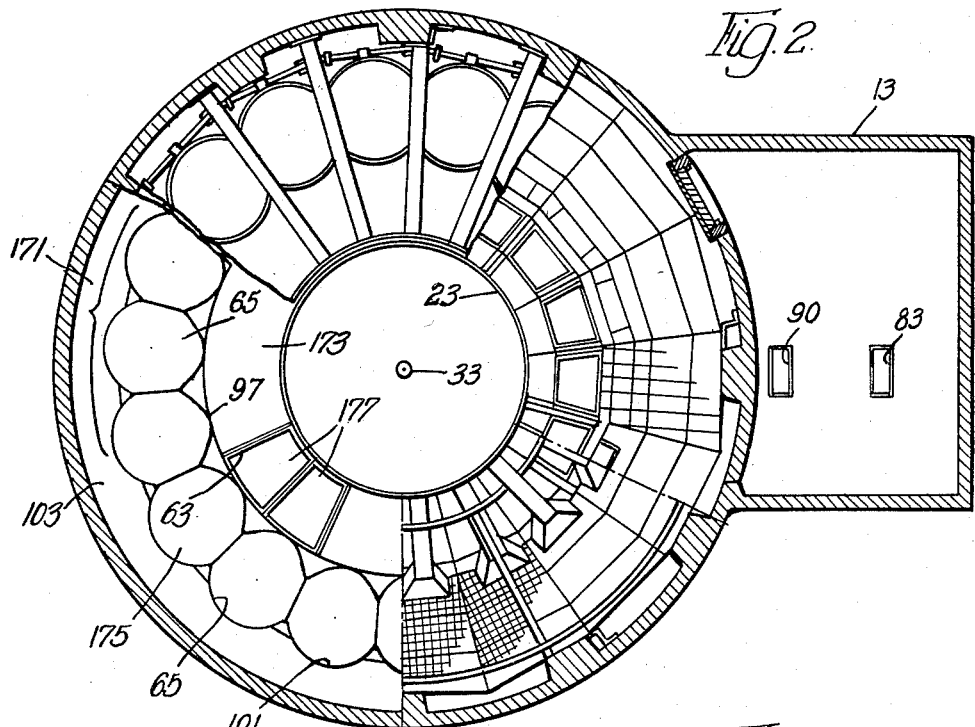
Figure 2 is a transverse section taken at various elevations to show the construction.

Referring first to the general construction as shown in the vertical sections of Figures 1A and 1B, the entire apparatus is housed in a circular outer building wall 11 with the exception of certain elevating mechanism which, as shown in plan view in Figure 6, is housed in a rectangular, laterally extending housing 13. The conical hopper 15 comprises the lower portion of the malt handling apparatus and is formed of steel plates and supported at its upper edge on a frame structure including the beams 17. The lower portion of the hopper 15 is provided with a reentrant V-shaped structure 19, best shown in Figure 5.

Centrally located of the entire structure is the central air passage 23 which is in the form of a vertically extending tube with large cross section. Its lower end 25 is open so that air passing down through the tube 23 passes into the lower air chamber 27 which is closed by the cone 29. The bottom of this cone discharges into a pipe 31 which may be used to draw off excess water from the cone. The vertically extending water spray pipe 33 leads into the lower portion of discharge pipe 31, and extends upwardly through the center of this pipe 31, upwardly through cone 29 and then centrally upwardly through the cylindrical air chamber 23. Referring now particularly to the showing in Figure 1A, the water pipe 33 has its upper portion provided with spray jets, as shown at 35, so that water may be sprayed into the upper portion of the air chamber 23 to humidify the air. The upper end of pipe 35 is supported from the walls of chamber 23 by laterally extending members 37.

The upper end of air passage 23 is connected by the conical portion 39 to a cylindrical portion 41 which is, in turn, connected by further conical portion 43 to the air blower 45. Intake air is conducted to the blower 45 through passage 47, the air flow being controlled by damper 49. The intake of air to the passage 47 may come as fresh air from the passage 50 leading through the roof 51 or may comprise recirculated air from passage 52 leading from below, or the air may be partially fresh and partially recirculated, the flow ratio being controlled by damper 49.

The building structure 11 is shown as provided with a roof 51 having an opening 53 and removable closure 55 located about the center of the apparatus so that a clearance may be provided for installation and servicing of the central apparatus. The upper chamber 57 of the housing is shown as provided with a floor 59 above the main portion of the malting apparatus. The apparatus is provided with an air uptake chamber 61 which extends circularly around the central downdraft air chamber 23. This chamber 61 is divided in a plurality of compartments by radial walls as shown at 63 in Figure 2. About the circumference of the divided air uptake chamber 61 are located a plurality of grain holding bins 65 shown in plan view in Figure 2 these bins being generally circular in cross section but having their vertical radial sides flat to conform to radial lines of the entire installation. The lower ends of some of the various sectors making up the air uptake chambers 61 are closed by individual dampers 67. The bottoms of the grain cells 65 are each closed by a pair of doors 69.

The bottom of the cone 15 is provided with the reentrant V-shaped divider structure 19 which causes the grain to be divided and discharged into the two conveyor troughs 71 and 72 provided with the spiral conveyors 73 and 74. Water spray pipes 75 extend above the conveyors 73 and 74 and the bottoms of troughs 71 and 72 are perforated to permit excess water to drain into the lower troughs 76 and 77. Trough 71 is provided with a lower discharge opening 78 controlled by hand wheel 79. Conveyor trough 72 discharges into a cross conveyor 80 which in turn discharges into trough 71 above the discharge opening 78. Grain handled by the conveyors may be discharged through opening 78 into an elevating conveyor 81 having an upwardly extending leg 83 which carries the grain over the top of the conveyor assembly 85 and discharges it downwardly into chute 87 in the top malting chamber 57, as shown in Figure 1A. This conveyor is driven by the motor 89. The empty conveyor elements pass downwardly for refilling through the conveyor leg 90. An additional horizontal conveyor 91 extends through the wall of the building and is reversible so that it may not only carry away the finished malt, but may bring steeped grain into the apparatus for malting. This grain will be delivered to the bins by the elevating conveyor 81.

From chute 87 the grain is passed to a rotary distributor at 93 which carries the grain around in a circle and will discharge it through a selected chute 95, then to any desired grain bin 65. It will be understood that suitable closures are provided in the distributor 93 so that the grain may be distributed to a selected bin while the chutes 95 to other bins remain closed.

The outer walls 97 of air uptakes 61, which form the inner walls of bins 65, are perforated except for a short upper section 97, shown in Figure 1A, which may extend for approximately four feet for a purpose to be hereinafter described. The outer walls 101 of the bins 65 are formed with perforate portions throughout so that air may pass upwardly and outwardly through any grain above the lower edge of the imperforate portion of the inner walls 97. The circular discharge air offtake chamber 103 surounds all of the outer bins' walls 101. Air from this chamber passes upwardly through the vertical flue 105, shown in Figure 6, to be discharged through the roof of the building. A portion of the discharge air will pass into flue 52 to be recirculated if the damper 49 is suitably adjusted. Fresh air to be drawn into the system comes down flue 50 to damper 49.

The dampers 67 which close the bottoms of the various vertical air passages 61 are shown in some detail in Figure 9. These doors 67, as shown, are hinged at 107 at their outer edges and swing downwardly on these hinges, being operated by pneumatic cylinders 109 pivoted at 111 to the outer cylindrical wall 112 below the air passages 61. The piston rods 113 are connected to the undersides of the doors at 115. The operation will be apparent from the open position which is shown in broken lines in Figure 9.

The bin doors 69, shown in Figure 10, are operated by means of the hydraulic mechanism shown in Figures 7 and 8 and the linkage shown in Figure 10. The hydraulic cylinders 117 are pivoted to radial beams 119 and their piston rods 121 are connected to pin 123 which passes through the upper ends of the yokes 125. The lower ends of these yokes 125 are pivoted at 127 to angle irons 129 secured to the upper faces of radial I-beams 131. The lifting links 133 are pivoted at their upper ends on the pin 123 and their lower ends are pivotally connected at 135 to the swinging arms 137. One end of each arm 137 is pivotally connected at 139 to a bracket structure 141 secured to the lower face of the I-beam 131. The hanger 143 is pivotally connected at 145 to the free end of the arm 137 and its lower end carries the plate 147. This plate 147 has pivotally secured thereto the rods 149 and 151.

As shown in Figure 10, the rods 149 and 151 are connected at their lower ends to the bin doors 69. These doors part on a radial line, each door covering half of the bottom area of a grain holding bin. The doors are pivoted at the bottom of the bin dividing walls 153.

Figure 3:
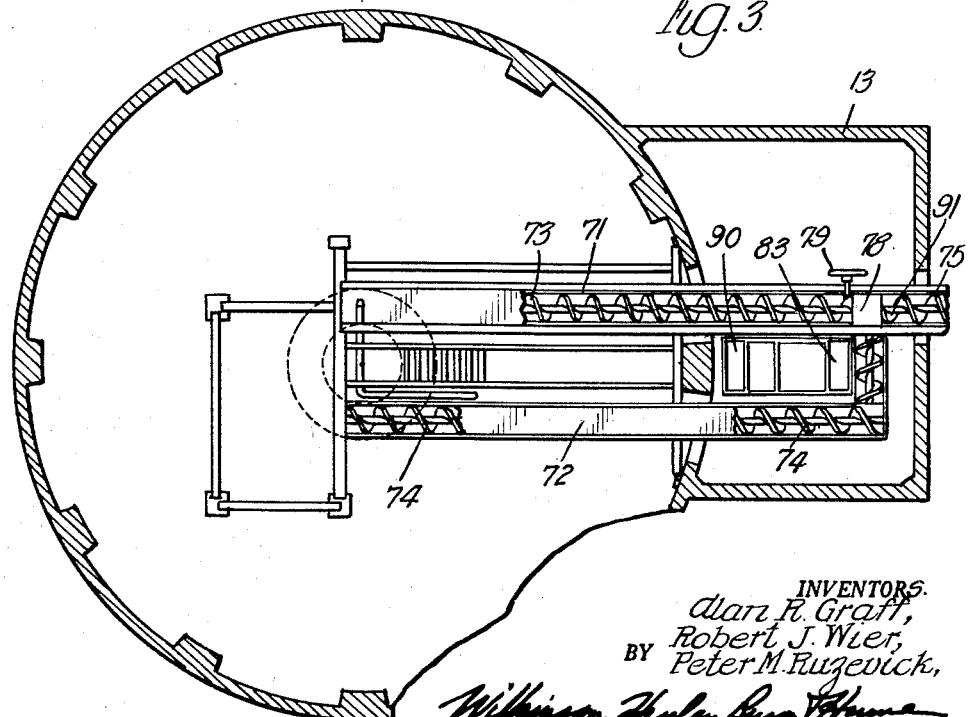
Figure 3 is a section taken on line 3—3 of Figure 1B.

In the operation of the apparatus, assuming that all of the bins are empty, the steeped grain is brought into the apparatus by means of the conveyor 91, shown in Figure 3. This conveyor will be operated to move the grain from right to left as seen in Figure 3, and the grain will be supplied to the conveyor by any source (not shown).

The door 78 located in the bottom of the trough 71 is opened and the grain discharges down to the conveyor boot 81 and is lifted by conveyor leg 83 to the upper portion of the structure where it is delivered through chute 87 to the circular distributing conveyor 93. Selected doors of this distributor 93 are opened and the grain flows down through chutes 95 to the selected bins 65. Grain is fed to each of the selected bins until it extends throughout the perforate portion of the bin and up into the imperforate upper few feet of the bin. This serves as a seal to prevent air from passing through the perforate walls of the bin without passing through grain which would be the case were the grain level below the top of the perforate bin wall portions.

Referring to Figure 2 which shows the bins at various elevations, the group of bins 171 at the left of Figure 2 all open into a common air uptake passage 173. There may be several such groups of bins. Individual bins 175, shown as located between groups of bins such as 171, are each provided with separate vertical air passages 177. In initially filling the bins with steeped grain it will be placed into the spaced groups of three bins which have common air inlets 173. After the grain has been placed in any of the bins to the desired height the dampers 67, if present, closing the bottoms of the air uptake passages opposite these bins, are opened. If desired, dampers may be omitted from the bottoms of the wider air uptake passages 173. In this case all bins not opposite uptake passages controlled by dampers must be filled.

The blower 45 at the top is put into operation which blows air downwardly through the large central air downtake 23, the air passing out of the bottom of this downtake and up through the air uptakes 61 not closed by dampers 67, or through wider uptakes 173 as shown in Figure 2. The air passes laterally through the inner perforate bin walls 97, through the grain therein and out through the rear perforate bin walls 101 into the air uptake 103. From this circular exhaust uptake 103 the air passes out the roof through the opening 105 shown in Figure 6. The air going to passage 52 can be recirculated in whole or in part by suitable setting of the damper 49. The temperature and humidity of the air will be controlled according to the requirements of the process as the germination of the grain progresses. When it is desired to increase the humidity or decrease the temperature of the air, the spray nozzles 35 in the upwardly extending air pipe 33 are supplied with water through that pipe, and the water is sprayed generally throughout the cross sectional area of the air downtake tube 23. Excess water not taken up by the air drops to the cone-shaped bottom 29 and is drawn off through offtake pipe 31.

When it is desired to move the germinating grain in order to aerate it, turn it over, and prevent packing or matting, the bottom bin doors 69 of one or more of the bins are opened by means of the mechanism shown in Figures 7, 8, and 10, and the bin bottom being entirely unobstructed, the grain falls downwardly to the cone 15 at the bottom of the installation. The V-shaped divider structure 19 divides the grain and it is discharged into conveyor trough 71 and 72. This discharge is accomplished by gravity flow. The screw conveyors 73 and 74 are now operated to move the grain to the right, as seen in Figure 3. Conveyor 74 discharges onto conveyor 80 which is also now put in operation. The door 78 is opened and the grain falls down onto conveyor 81 which elevates it through elevator leg 83, down spout 87 and on to the distributing conveyor 93. By this means the grain may be returned to the bin from which it was taken or to any other selected bin.

The grain expands very substantially during the germination period and when it is dropped and lifted again, due to the expansion of the rootlets, it will take up a larger volume in the bin than before it was dropped and re-elevated. For this reason, when it is restored to the bin from which it came and discharged therein to a level above the perforate portion of the bin, there will be a substantial quantity left. This surplus will be delivered to another bin. This operation may be carried out continuously, bin after bin being dropped to the bottom of the apparatus and re-elevated. Thus, for example, after six bins have been dropped and re-elevated it may be found that the germinating grain at that time will occupy one-seventh more space and the remaining grain may be dropped into a separate bin 175, as shown in Figure 2. The individual door 67 to the vertical air duct leading to this bin will then be opened and then as the process is carried on, air will pass up through that duct. It wll be understood that it was necessary to have any unoccupied bin closed off as otherwise the air would pass freely through the perforate sides of such empty bin and would thus not pass through the grain in the filled bins which would offer a much greater resistance to the passage of air. By providing groups of bins to receive the initial charge and then a plurality of individual bins, it is possible to take care of the increase in volume of the grain as the germination progresses. By the separate dampers to the individual bins, air will only be admitted opposite filled bins.

After the germination of the grain has reached the desired point, the charge may be dried in the same apparatus. This is accomplished by passing substantial quantities of heated air through the charge in the bins. If it is desired to carry out the drying operation in the present apparatus any usual means (not shown) may be added for heating the air. During the drying stage of the process the charge is also turned over at desired intervals by dropping it from the bins and elevating it to return it to the bins. During the drying stage the volume of the charge decreases to some extent. This decrease in volume is taken care of in the reverse of the manner in which the increased volume is taken care of during the germination stage. Fewer bins may be used, but each bin will be filled up into the lower part of its imperforate upper portion. Dampers will be closed, as required, to keep the heated air from empty bins.

It will be apparent that the arrangement and proportions of the parts of the apparatus with concentric air passages and grain bins is such as to require a minimum of building and apparatus volume and a minimum ground area requirement per unit of annual capacity.

The use of a single circular distributing conveyor at the top of the unit to charge each bin or any desired bins successively simplifies the design and construction. The use of a central gathering cone or hopper at the bottom of the apparatus to receive grain or malt discharged by gravity from the bins facilitates handling the grain. These two features combined with the vertical elevating conveyor make it possible to arrange automatic instruments to take care of the shifting of the grain from one bin to the next so as to provide the desired full volume in each bin. The entire arrangement of air passages, fans, grain bins and conveyors lends itself particularly to automatic instrumentation for temperature and humidity control.

The air flow is efficiently designed with the fan discharging from the top of the apparatus directly downwardly into a central chamber where air moistening sprays are mounted on a central pipe. This fan arrangement and central spray chamber are highly economical of space and insure thorough moistening of the air. The construction of the air uptakes surrounding the central air downtake chamber also constitutes an efficient use of space and this combined with the placing of the malt chambers circumferentially around the annular series of air uptakes and the control of the air by dampers at the lower ends of the air uptakes, insures that all air must go through the malt before leaving the apparatus. This increases the efficiency of utilization of refrigeration in summer operation of the unit and also increases the efficiency of utilization of heated air in the malt drying stage of the operation.

The apparatus is designed to adequately take care of expansion and contraction of the charge by providing certain of the individual bins with dampers for cutting off the air supply thus permitting them to remain empty without loss of air. For changes in volume amounting to less than the capacity of a single bin, there have been provided imperforate sections of the bin walls at the tops of the bins which may extend for approximately four feet in height.

During the movement of the sprouting grain in the malting and drying process, some of the rootlets and other matter are normally broken off. It is desirable to keep such material out of the water draining into and out of the cone 29. For that reason a gutter 181 is located around the upper edge of the cone 29, the inner edge of the gutter being guarded by a rail 183. A drainage opening 185 in the gutter is normally closed by a screw plug 187 which may be removed by means of handle 189. An operator may enter the cone 29 to work on gutter 181 through the normally closed manhole 191. The operator will remove plug 187 and sweep or flood the waste in the gutter through opening 185 where it will fall into the hopper 15. It will be discharged from hopper 15 by means of conveyors 73 and 74.

The provision of simple swinging doors to discharge the grain from each bin is important in that it permits rapid dropping of the grain without danger of bridging. The vertical extent of the bins is entirely unobstructed which also prevents bridging and permits rapid charging and discharging of the grain relative to the bins. The general arrangement of the air flow, which is highly economical of space, is important. The central air downtake and each annulus surrounding it are adjusted dimensionally to the cross sectional area required to give optimum air flow rates. Thus air flow is provided at a high rate consistent with reasonably low pressure drops throughout the unit.

While we have shown certain preferred embodiments of our invention it will be apparent that they may be varied to meet different conditions and requirements and we contemplate such modifications as come within the spirit and scope of the appended claims.

We claim:

1. Vertical malting apparatus comprising air delivery means at the upper portion of the apparatus, a centrally located air downtake leading from the air delivery means, a plurality of air uptake passages around the air downtake and communicating with its lower end, vertical grain holding bins adjacent the air uptakes, said bins having perforate walls communicating with the uptakes, and a discharge air chamber outwardly of the bins, the outer walls of the bins being perforate and communicating with the air discharge chamber.

2. Vertical malting apparatus comprising air delivery means at the upper portion of the apparatus, a centrally located air downtake leading from the air delivery means, a plurality of air uptake passages around the air downtake and communicating with its lower end, vertical grain holding bins adjacent the air uptakes, said bins having perforate walls communicating with the uptakes, and a discharge air chamber outwardly of the bins, the outer walls of the bins being perforate and communicating with the air discharge chamber, the inner bin walls having their upper portions imperforate for a substantial distance below their upper ends.

3. Vertical malting apparatus comprising air delivery means at the upper portion of the apparatus, a centrally located air downtake leading from the air delivery means, a plurality of air uptake passages around the air downtake and communicating with its lower end, vertical grain holding bins adjacent the air uptakes, said bins having perforate walls communicating with the uptakes, and a discharge air chamber outwardly of the bins, the outer walls of the bins, being perforate and communicating with the air discharge chamber, the apparatus including a central closed chamber located below and communicating with the air downtake and air uptakes and having walls connected to the inner lower edges of the bins, and dampers serving to selectively close off the air uptakes from the chamber.

4. Vertical malting apparatus comprising air delivery means at the upper portion of the apparatus, a centrally located air downtake leading from the air delivery means, a plurality of air uptake passages around the air downtake and communicating with its lower end, vertical grain holding bins adjacent the air uptakes, said bins having perforate walls communicating with the uptakes, and a discharge air chamber outwardly of the bins, the outer walls of the bins being perforate and communicating with the air discharge chamber, the apparatus including a central closed chamber in the form of an inverted cone located below and communicating with the air downtake and air uptakes, the upper edge of the cone being connected to the inner lower edges of the bins, means for spraying water extending upwardly of the air downtake and means for withdrawing surplus water connected to the bottom of the cone.

5. Vertical malting apparatus comprising air delivery means at the upper portion of the apparatus, a centrally located air downtake leading from the air delivery means, a plurality of air uptake passages around the air downtake and communicating with its lower end, vertical grain holding bins adjacent the air uptakes, said bins having perforate walls communicating with the uptakes, and a discharge air chamber outwardly of the bins, the outer walls of the bins being perforate and communicating with the air discharge chamber, a grain receiving hopper located below the grain holding bins to receive grain by gravity from said bins, an openable closure located at the bottom of each bin, means for removing grain from the hopper and means for returning grain to the upper ends of selected grain bins.

6. Vertical malting apparatus comprising air delivery means at the upper portion of the apparatus, a centrally located air downtake leading from the air delivery means, a plurality of air uptake passages around the air downtake and communicating with its lower end, vertical grain holding bins adjacent the air uptakes, said bins having perforate walls communicating with the uptakes, and a discharge air chamber outwardly of the bins, the outer walls of the bins being perforate and communicating with the air discharge chamber, the apparatus including a central closed chamber in the form of an inverted cone located below and communicating with the air downtake and air uptakes, the upper edge of the cone being connected to the inner lower edges of the bins, means for spraying water extending upwardly of the air downtake and means for withdrawing surplus water connected to the bottom of the cone, a grain receiving hopper located below the grain holding bins and the closed chamber, an openable closure member located at the bottom of each bin, means for removing grain from the hopper and means for returning grain to the upper ends of selected grain bins.

7. Vertical malting apparatus comprising air delivery means at the upper portion of the apparatus, a centrally located tubular air downtake leading downwardly from the air delivery means, vertical walls extending radially outward from the tubular downtake, vertically extending grain holding bins between the radial walls spaced outwardly from the downtake to provide air uptakes between the downtake and bins, an outer housing wall spaced outwardly of the bins to provide an air discharge chamber, the bin walls having perforate inner and outer portions communicating with the air uptakes and air discharge chamber respectively, means for selectively closing communication between the air downtake and air uptakes and movable bottom closures for the bins.

8. Vertical malting apparatus comprising air delivery means at the upper portion of the apparatus, a centrally located tubular air downtake leading downwardly from the air delivery means, vertical walls extending radially outward from the tubular downtake, vertically extending grain holding bins between the radial walls spaced outwardly from the downtake to provide air uptakes between the downtake and bins, an outer housing wall spaced outwardly of the bins to provide an air discharge chamber, the bin's walls having perforate inner and outer portions communicating with the air uptakes and air discharge chamber respectively, means for selectively closing communication between the air downtake and air uptakes, movable bottom closures for the bins, a central closed chamber located below and connecting the air downtake and air uptakes and a grain receiving hopper located below the central closed chamber and connected to the lower ends of the grain bins.

9. Vertical malting apparatus comprising air delivery means at the upper portion of the apparatus, a centrally located tubular air downtake leading downwardly from the air delivery means, vertical walls extending radially outward from the tubular downtake, vertically extending grain holding bins between the radial walls spaced outwardly from the downtake to provide air uptakes between the downtake and bins, an outer housing wall spaced outwardly of the bins to provide an air discharge chamber, the bin walls having perforate inner and outer portions communicating with the air uptakes and air discharge chamber respectively, means for selectively closing communication between the air downtake and certain of the air uptakes, means at the bottom of the bins for selectively retaining grain in the bins and discharging it therefrom, a central closed chamber located below and connecting the air downtake and air uptakes, a grain receiving hopper located below the central closed chamber and connected to the lower ends of the grain bins, means for discharging water sprays in the air downtake and a pipe for withdrawing excess water from the closed chamber.

10. Vertical malting apparatus comprising air delivery means at the upper portion of the apparatus, a centrally located tubular air downtake leading downwardly from the air delivery means, vertical walls extending radially outward from the tubular downtake, vertically extending grain holding bins between the radial walls spaced outwardly from the downtake to provide air uptakes between the downtake and bins, an outer housing wall spaced outwardly of the bins to provide an air discharge chamber, the bin walls having perforate inner and outer portions communicating with the air uptakes and air discharge chamber respectively, means for selectively closing communication between the air downtake and certain of the air uptakes, means at the bottom of the bins for selectively retaining grain in the bins and discharging it therefrom, a central closed chamber located below and connecting the air downtake and air uptakes, a grain receiving hopper located below the central closed chamber and connected to the lower ends of the grain bins, said hopper being conical in shape, means for discharging grain from the lower portion of the hopper, a conveyor for receiving grain from the hopper, a spray pipe located adjacent the conveyor to spray water on grain therein, an elevating conveyor for lifting grain from said first named conveyor and discharging it in the upper portion of the apparatus and means in the upper portion of the apparatus for selectively distributing grain from the elevating conveyor to the grain bins.

11. Vertical malting apparatus comprising air delivery means at the upper portion of the apparatus, a centrally located tubular air downtake leading downwardly from the air delivery means, vertical walls extending radially outward from the tubular downtake, vertically extending grain holding bins between the radial walls spaced outwardly from the downtake to provide air uptakes between the downtake and bins, an outer housing wall spaced outwardly of the bins to provide an air discharge chamber, the bin walls having perforate inner and outer portions communicating with the air uptakes and air discharge chamber respectively, means for selectively closing communication between the air downtake and certain of the air uptakes, means at the bottom of the bins for selectively retaining grain in the bins and discharging it therefrom, the radial walls having different circumferential spacing and the grain bins being each of substantially the same circumferential extent, there being a plurality of bins between certain radial walls with a common air uptake defined by the radial walls and single bins between certain of the radial walls.

12. Vertical malting apparatus comprising air delivery means at the upper portion of the apparatus, a centrally located tubular air downtake leading downwardly from the air delivery means, vertical walls extending radially outward from the tubular downtake, vertically extending grain holding bins between the radial walls spaced outwardly from the downtake to provide air uptakes between the downtake and bins, an outer housing wall spaced outwardly of the bins to provide an air discharge chamber, the bin walls having perforate inner and outer portions communicating with the air uptakes and air discharge chamber respectively, means for selectively closing communication between the air downtake and certain of the air uptakes, and movable bottom closures for the bins, said bottom closures comprising doors swinging downwardly to open, the vertical extent of the bins above the doors being unobstructed.

13. Vertical malting apparatus comprising air delivery means at the upper portion of the apparatus, a centrally located tubular air downtake leading downwardly from the air delivery means, vertical walls extending radially outward from the tubular downtake, vertically extending grain holding bins between the radial walls spaced outwardly from the downtake to provide air uptakes between the downtake and bins, an outer housing wall spaced outwardly of the bins to provide an air discharge chamber, the bin walls having perforate inner and outer portions communicating with the air uptakes and air discharge chamber respectively, means for selectively closing communication between the air uptake and air downtakes, and movable bottom closures for the bins, said bottom closures comprising pairs of half doors for each bin, radial walls separating the bins and the half doors being pivoted adjacent the lower edges of said radial walls.

14. Vertical malting apparatus comprising central air delivery passages, a plurality of vertically extending grain bins forming a circle about said air delivery passages, an air offtake passage surrounding the bins, said bins having inner and outer perforate portions communicating with the air delivery and air offtake passage, a grain receiving hopper located below all said bins, movable bottom closure means for the bins, means for discharging grain from said hopper and elevating it to a point above the bins, a circular distributing conveyor above the bins receiving elevated grain, said distributing conveyor having a chute connected to the upper portion of each bin, and movable means for selectively closing the conveyor ends of said chutes.

15. Vertical malting apparatus comprising central air delivery passages, a plurality of vertically extending grain bins forming a circle about said air delivery passages, an air offtake passage surrounding the bins, said bins having inner and outer perforate portions communicating with the air delivery and air offtake passage, a grain receiving hopper located below all said bins, movable bottom closure means for the bins, means for discharging grain from said hopper and elevating it to a point above the bins, a circular distributing conveyor above the bins receiving elevated grain, said distributing conveyor having a chute connected to the upper portion of each bin, a movable circular closure plate for closing the conveyor ends of said chutes, said plate being movable to open a selected chute, and means for delivering air to the central air delivery passages, said means being located above the distributing conveyor and connecting to the air delivery passages centrally of said distributing conveyor.

16. Vertical malting apparatus comprising a plurality of vertically extending grain bins, air delivery passages adjacent one side of the bins, air offtake passages adjacent another side of the bins, said bins having perforate portions communicating with the air delivery and an offtake passage, a grain receiving hopper located below the bins, movable bottom closures for the bins, conveying means below the hopper extending laterally of the bins, means for discharging grain from the bins into the conveying means, connecting conveying means for elevating the grain to a level above the bins, a distributing conveyor above the bins for selectively passing grain to the bins and means for carrying grain from the elevating conveying means to the distributing conveyor.

References Cited in the file of this patent
UNITED STATES PATENTS

| | | |
|---|---|---|
| 409,956 | Gent | Aug. 27, 1889 |
| 485,355 | Rathmann | Nov. 1, 1892 |
| 936,011 | Meyer | Oct. 5, 1909 |
| 2,654,691 | Frauenheim | Oct. 6, 1953 |
| 2,671,045 | Ruzicka | Mar. 2, 1954 |